Figure 1:
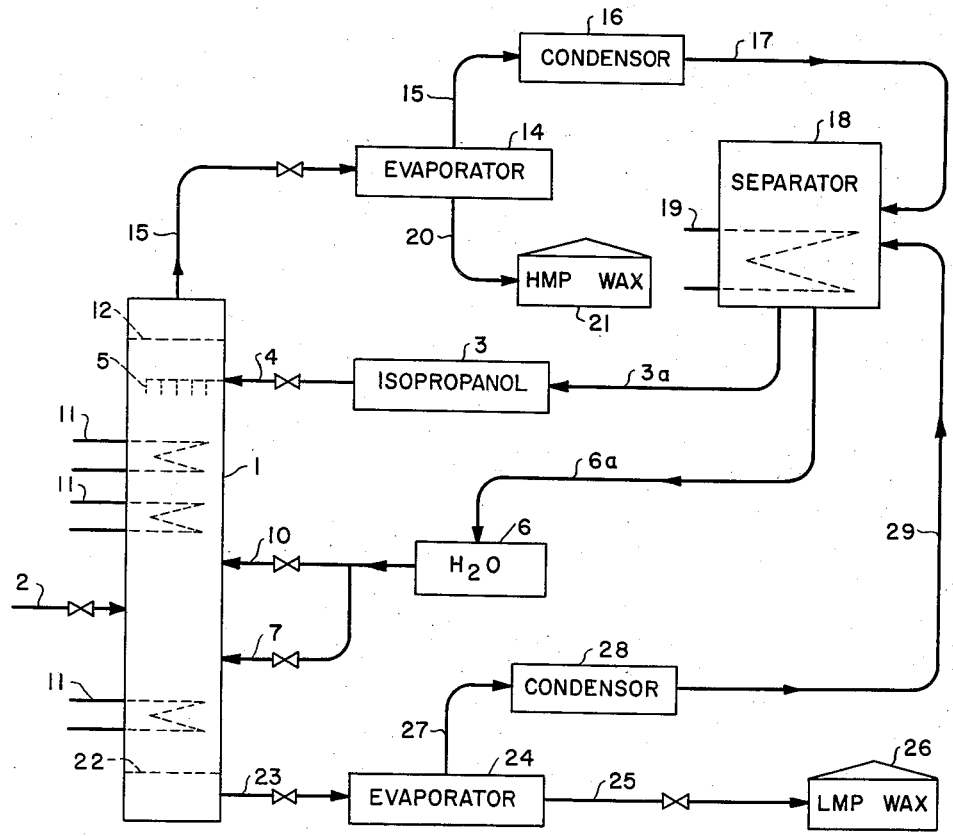

June 26, 1962
K. G. ARABIAN ET AL
3,041,268
SOLVENT FRACTIONATION OF WAX CONTAINING MIXTURES
Filed Dec. 23, 1959

INVENTORS:
KAREKIN G. ARABIAN
NELSON CARRAWAY
BY: William H. Myers
THEIR AGENT

3,041,268
SOLVENT FRACTIONATION OF WAX CONTAINING MIXTURES

Karekin G. Arabian, Houston, and Nelson Carraway, Pasadena, Tex., assignors to Shell Oil Company, a corporation of Delaware
Filed Dec. 23, 1959, Ser. No. 861,508
7 Claims. (Cl. 208—31)

This invention relates to the treatment of wax-containing mixtures. More particularly, it relates to the separation of wax-containing mixtures into fractions of higher and lower melting points using a liquid-to-liquid contact system not requiring, in its essential step, the use of filtration equipment.

The present invention applies not only to the dewaxing of petroleum oils but also to (and preferably to) the deoiling of waxes obtained from waxy lubricating oils.

The separation of wax from associated oils is normally carried out, at the present time, by diluting the oily wax or waxy oil with certain solvents or solvent combinations followed by cooling to precipitate a preferred fraction of the waxy components. Subsequently, the latter are separated from the remaining solution of oil and solvent by filtration or centrifuging. This is an expensive process since it requires refrigeration apparatus, large filtration surfaces and associated equipment. Hence, any process which can be devised for avoiding filtration or centrifuging or which minimizes these operations, should provide improved efficiency in the isolation of waxes from oils or in the fractionation of wax mixtures.

A number of processes have been suggested in the prior art for liquid-liquid dewaxing of wax-containing mixtures involving complicated or undesirable solvent combinations. None of this prior work leads to a generalization which will aid experts in the art to predict or suggest the conditions necessary for providing satisfactory solvents to be used in such a process. In other words, the state of the art at present in the liquid-liquid fractionation of waxes or waxy oils must be regarded as empirical and past disclosures cannot aid materially in providing suggestions for further advances in this field.

It has been found that the various solvents previously suggested are either not sufficiently sensitive for satisfactory fractionation of wax mixtures, are objectionable in that traces thereof remain in the waxes or have such high boiling points as to be difficult to separate from the waxes after treatment.

It is therefore an object of the present invention to provide a solvent system found to be exceptionally and unexpectedly sensitive with respect to good fractionation of wax mixtures. It is another object of the invention to provide a solvent system which is readily separated from the waxes after treatment. It is a further object of the invention to provide a solvent system which may be combined with later conventional dewaxing procedures. Finally, it is an object of the invention to provide a solvent system of relatively low cost and conveniently available at most refining locations. Other objects will become apparent during the following detailed description of the invention.

Now, in accordance with the present invention, a process of wax fractionation is provided wherein a wax-containing mixture is separated into fractions of higher and lower melting points by contacting (preferably countercurrently) the mixture in an extraction zone with isopropyl alcohol modified by the presence of 0.5–4% (by volume based on the alcohol) of water, the temperature of the operation being adjusted so that two liquid phases are formed, one comprising the higher melting wax fraction with minor amounts of isopropyl alcohol and water, separating the liquid phases from one another and removing the aqueous isopropanol from each.

If desired, additional treatments may be utilized for still further separation of the wax fractions, such as by utilizing conventional dewaxing procedures on either or both of the separated fractions. According to one preferred procedure, the separated fractions may be cooled to such a point that a desired wax fraction precipitates as a solid wax after which it is separated from the remaining liquid components by conventional procedures such as filtration or centrifuging. A second preferred further treatment comprises the addition to the separated liquid phase from the initial essential step of a "filtration solvent," which is preferably one substantially immiscible with the waxy components present in the fraction being so treated. Under these conditions a predetermined wax fraction precipitates as a solid and can thereafter be removed from the remaining liquid components present. The success of the process depends upon the control of temperature throughout the extraction zone for the initial separation of the wax-containing mixture and upon the regulation of the proportions of isopropyl alcohol and water both relative to each other and relative to the volume of wax containing mixture.

The present invention is based upon the discovery that such conditions can be coordinated to result in an unpredictable separation of wax-containing mixture into two differing wax-containing fractions. For this purpose, it is necessary to maintain the proportion of isopropyl alcohol relative to wax-containing mixture between about 1.5 to 5 volumes of isopropyl alcohol per volume of wax-containing mixture and, at the same time, to maintain the proportion of water in the system between about 0.5% and 4% by volume based on the isopropyl alcohol. These proportions of isopropanol and water are furthermore coordinated with the use of temperature within the range between about 50 and 200° F., dependent upon the proportions of isopropanol and water and upon the exact identity of the wax-containing mixture.

For relatively low boiling wax-containing mixtures, such as extracted gas oil, it is necessary to use relatively low temperatures in the order of 50–70° F. in order to obtain satisfactory differentiation between two liquid layers. However, when higher boiling wax-containing mixtures, such as bright stock raffinate or crude wax from intermediate boiling lubricating oil cuts, is to be fractionated according to the present process, it is necessary to utilize temperatures in the order of 135° F.–200° F. preferably 140–175° F. Below these temperatures, which are readily ascertainable by experiment with any particular stock, it has been found that precipitation of solid wax particles occurs which is undesirable and defeats the primary objective of the present invention. Above the temperatures found to be optimum the differentiations between two fractions becomes minimized and in fact may disappear altogether, since at sufficiently elevated temperature only a single liquid phase may be formed.

It is necessary to utilize the combination of isopropyl alcohol and water as defined hereinbefore if the maximum degree of fractionation is to be obtained. The use of other alcohols such as methanol, ethanol or butanol do indeed result in fractionation but not of as desirable an extent as is obtained by the combination of isopropanol and water when the water is maintained within the concentration specified here. In the absence of water the use of isopropanol is not especially desirable since wax components precipitate before two liquid layers appear during the cooling of the waxy mixture and isopropanol associated therewith. Above the limited water percentage specified the selectivity is reduced and the solvent power of isopropanol for the waxy mixtures likewise is decreased. Ethyl alcohol has been found to have poor selectivity while butyl or amyl alcohols require larger amounts of water to form two phases and also have poorer selectivity than isopropyl alcohol.

The process of the present invention may be carried out in a multi stage batch extraction system or, more preferably, in a continuous extraction system which is preferably a countercurrent extraction system. It is preferred that a tower be provided with perforated baffles or containing a packing material such as ceramin shapes, tiles, metal mold, or fragments of ceramic material, glass, plumas or concrete. For most effective operation, a temperature gradient is maintained in the system by means of heating or cooling oils or jackets, the temperature increasing in the direction of flow of the raffinate or higher melting wax fraction.

The present invention may be further understood with reference to the accompanying drawing which illustrates diagrammatically the continuous extraction system suitable for carrying out the essential step in the present process.

Referring to FIGURE 1, a wax-containing mixture is continuously introduced in liquid condition into the extraction tower 1 through a valve controlled line 2. Isopropyl alcohol is continuously introduced from vessel 3 by means of valve controlled line 4 and manifold 5 into the upper section of the tower 1 below the raffinate outlet. Water is continuously introduced from vessel 6 through valve controlled line 7 into the extraction tower 1 below the wax inlet at a rate controlled to produce a mixture containing an isopropanol-water mixture specified as hereinbefore. An intimate countercurrent contacting of the waxy stock, isopropanol and water is effected in tower 1, a temperature gradient being maintained in the tower by means of coils 11 through which a heating or cooling medium is circulated as require, the temperature adjacent to the top of the tower being higher than that adjacent to the bottom of the tower, the contents being entirely in liquid phase.

The waxy stock being subjected to the action of the solvent modified with water separates into two fractions, the higher melting fraction wax passing upwardly through the tower together with a minor amount of dissolved isopropanol and water. The higher melting wax, isopropanol and water are withdrawn from the tower above the level of the dotted line 12 representing the higher melting wax phase relatively free of entrained, immiscible second phase or isopropanol-water. The raffinate phase (comprising the higher melting wax and dissolved isopropanol and water) is passed from the top of tower 1 through valve controlled line 13 into a vacuum evaporator or still 14 wherein the isopropanol and water are removed from the higher melting wax by vaporization, the solvent and water vapors being delivered by line 15 to condenser 16, condensed, and the condensate being passed by line 17 to separator 18 provided with temperature control coil 19. The higher melting wax is drawn from the bottom of the evaporator 14 and delivered by valve controlled line 20 into storage vessel 21. This wax has a substantially higher melting point and lower oil content than the wax that was originally treated.

The extract phase, comprising the lower melting wax fraction, oil and the major portion of isopropanol and water, is withdrawn from the lower section of tower 1 beneath the level of the dotted line 22 representing the extract phase relatively free of entrained higher melting wax. The extract phase is delivered by valve control pipe 23 into a vacuum evaporator or still 24 wherein the isopropanol and water are vaporized from the lower melting wax, the latter being drawn from the bottom of the evaporator and passed by valve control pipe 25 to storage vessel 26. The lower melting wax has a lower melting point and a higher oil content than the original waxy stock.

The isopropanol and water vapors are passed from the top of the evaporator 24 through line 27, condensed in condenser 28 and the condensate is delivered by line 29 to separator 18. In the latter the isoproponal and water are separated and returned to their respective storage vessels.

In accordance with the general procedure of the invention, the wax containing mixture together with isopropanol and water are heated to a temperature sufficient to form a single homogeneous phase and then cooled until the mixture separates into two liquid layers. The temperature at which the separation occurs will vary in accordance with the exact nature of the wax-containing mixture and the proportion of isopropanol and water present.

Figure 2:
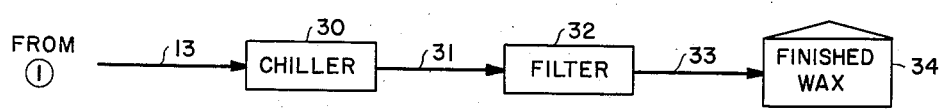

As suggested hereinbefore, the higher and lower melting point or congealing point fractions of the original mixture separated in accordance with the conditions specified hereinbefore may be still further treated if desired. Thus, in accordance with one alternative of these additional steps, it is possible to treat the separate fractions so as to precipitate solid wax and separate it from lower melting components present in one or both fractions. Reference is made to FIGURE 2 as exemplifying one process by which this may take place. The raffinate phase from separator 1 (in FIGURE 1) may be cooled in chiller 30 to precipitate solid wax, leaving in solution lower melting components or oily constituents. The slurry of solid wax and liquid components is sent by means of line 31 to filter area 32 wherein a separation of the solid and liquid components takes place. The solid wax so separated is sent by means of line 33 to finished wax storage 34. This procedure may be followed with the raffinate with the extract fraction using approximately the same type of equipment for this purpose.

Figure 3:
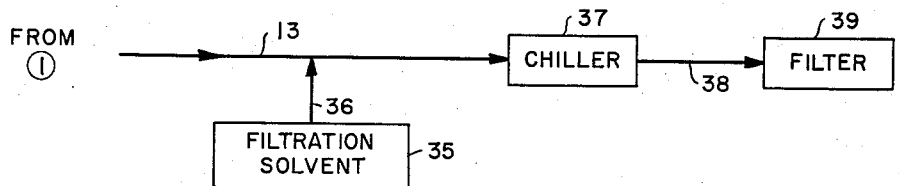

Alternatively, the separated fractions obtained in the description of the process according to FIGURE 1 may be diluted with a filtration solvent which may be either a solvent for wax or a non-solvent such as water, the latter being preferred. According to the provisions of FIGURE 3 the raffinate phase from extraction column 1 is modified in line 13 with a filtration solvent such as water from the filtration solvent storage 35 passing by line 36 into line 13. At the same time or subsequent thereto the temperature is lowered if necessary by passing a mixture through a chiller 37 after which it is conducted by means of line 38 to a filter 39. The separated wax is then conducted (by means not shown) to a finished wax storage tank 34. The filtrates may be further treated to recover lower melting point waxes or oils therefrom and to recover solvents and filtration solvents for recycle use in the described processes.

The following examples illustrate the essential steps of the process of this invention:

*Example I*

A waxy raffinate of an intermediate boiling range lubricating oil, having a congealing point of 105° F., was used in this example. Two volumes of isopropyl alcohol containing 1% water was added to one volume of the waxy raffinate. The components were heated until a single clear phase was obtained and then cooled to 115° F. and kept at this temperature without stirring for two minutes. The objective in this example was to remove waxy compents and obtain lubricating oil having a lower congealing temperature. Accordingly, the phase containing the lubricating oil in highest concentration was tested. In the present instance, the lubricating oil is concentrated in the upper liquid phase and constituted 14.7 parts of an original 41.3 parts of waxy raffinate. This had a congealing point of 103° F. and was utilized in two further stages of contacting with isopropanol containing 1% of water under the conditions specified above. After three such separations the congealing point of the upper layer was 98° F.

*Example II*

The conditions described above were repeated utilizing a bright stock raffinate obtained as a residual lubricating oil containing micro-crystalline wax and high melting point paraffin wax. The bright stock raffinate had an original congealing point of 142° F. The temperature of separation into two phases as described above occured at a temperature in the order of 178° F. and the upper layer constituting partially dewaxed bright stock after two such separations had a congealing point of about 132° F.

*Example III*

The same operations were conducted utilizing a crude paraffin wax obtained from an intermediate boiling lubricating oil fraction by standard solvent dewaxing procedures. The crude wax had a congealing point of 133° F. and when treated in accordance with the conditions described in Example I above separated into two liquid fractions at a temperature of about 140° F. Now, the objective was to separate a higher melting wax which is concentrated in the lower layer. Four such separations resulted in a lower layer product having a congealing point of about 138° F. (an increase of 5° F. over 133° F.).

Similar results were obtained by treatment of bright stock crude microcrystalline wax in order to partially deoil the latter. Four separations at a temperature of 170° F. resulted in raising the congealing point of the waxy fraction by about 4° F.

It is indicated, according to this, that multi-stage counter-current contacting is highly desirable in order to effect greater separations of products in accordance with the preferred version of the present invention.

We claim as our invention:

1. The method of separating a wax-containing mixture into fractions of higher and lower congealing points, which comprises contacting the mixture in an extraction zone with a solvent system consisting essentially of 1.5–5 volumes of isopropyl alcohol per volume of mixture and 0.5–4.0% by volume based on the alcohol of water at a temperature such that two immiscible liquid phases are formed, one comprising the higher congealing point fraction containing alcohol and water, and the other comprising alcohol, water and the lower congealing point fraction, separating the phases from one another and removing the alcohol and water from each.

2. The method of separating a wax-containing mixture into fractions of different melting points which comprises contacting the mixture in an extraction zone with a solvent system consisting essentially of 1.5–5 volumes of isopropyl alcohol per volume of the mixture and 0.5–4 by volume, based on the alcohol, of water at a temperature such that two liquid phases are formed, one comprising a higher melting fraction containing alcohol and water and the other comprising alcohol, water and a lower-melting wax fraction, separating the phases one from the other, separately adding to each of the phases a filtration solvent at a temperature such that a solid phase and a liquid phase are formed, in each case the solid phase comprising a higher melting wax fraction containing a minor portion of the alcohol, water and the filtration solvent, and the liquid phase comprising a lower melting fraction containing a major portion of isopropyl alcohol, water and filtration solvent, and removing the alcohol, water and filtration solvent from each fraction.

3. The method of separating a wax-containing mixture into fractions of different melting points which comprises contacting the mixture in an extraction zone with a solvent system consisting essentially of 1.5–5 volumes of isopropyl alcohol per volume of the mixture and 0.5–4% by volume, based on the alcohol, of water at a temperature such that two liquid phases are formed, one comprising a higher melting fraction containing alcohol and water and the other comprising alcohol, water and a lower-melting wax fraction, separating the phases one from the other, separately cooling each to a temperature such that a solid phase and a liquid phase are formed, in each case the solid phase comprising a higher melting fraction wax containing a minor portion of the alcohol and water, and the liquid phase comprising a lower melting fraction and a major portion of the alcohol and water, and removing the alcohol and water from each phase.

4. A process according to claim 1 wherein the alcohol:wax containing mixture ratio is between about 1.75 and 3 and the water is present in an amount between about 0.75% and about 1.5% based on the volume of alcohol.

5. A process according to claim 2 wherein the filtration solvent is water.

6. A process according to claim 4 wherein the wax-containing mixture is a waxy petroleum oil containing a major proportion of oil.

7. A process according to claim 4 wherein the wax-containing mixture is an oily petroleum wax containing a minor amount of oil.

References Cited in the file of this patent

UNITED STATES PATENTS

| 2,062,355 | Ellis | Dec. 1, 1936 |
| 2,106,234 | Bray | Jan. 25, 1938 |
| 2,189,647 | Fenske et al. | Feb. 6, 1940 |
| 2,578,510 | Clarke | Dec. 11, 1951 |

FOREIGN PATENTS

| 580,040 | Canada | July 21, 1951 |